United States Patent
Lin

(10) Patent No.: US 8,902,608 B2
(45) Date of Patent: Dec. 2, 2014

(54) SECURING DEVICE

(71) Applicant: Twinhead International Corporation, Taipei (TW)

(72) Inventor: Tsou-Kai Lin, Taipei (TW)

(73) Assignee: Twinhead International Corporation, Taipei (TW)

( * ) Notice: Subject to any disclaimer, the term of this patent is extended or adjusted under 35 U.S.C. 154(b) by 131 days.

(21) Appl. No.: 13/838,454

(22) Filed: Mar. 15, 2013

(65) Prior Publication Data

US 2014/0192482 A1   Jul. 10, 2014

(30) Foreign Application Priority Data

Jan. 8, 2013  (TW) .............................. 102100576 A

(51) Int. Cl.
*H05K 7/14* (2006.01)
*B60R 11/02* (2006.01)
*G06F 1/16* (2006.01)

(52) U.S. Cl.
CPC .......... *B60R 11/0252* (2013.01); *G06F 1/1656* (2013.01)
USPC ............. 361/801; 174/58; 174/135; 361/810; 361/679.4; 361/783; 312/223.2; 248/551

(58) Field of Classification Search
USPC ......... 174/58, 135; 361/679.4, 783, 752, 801, 361/807, 810; 248/551; 312/223.2
See application file for complete search history.

(56) References Cited

U.S. PATENT DOCUMENTS

| 7,738,255 B2 * | 6/2010 | Nishimoto et al. ........... 361/729 |
| 8,072,738 B2 * | 12/2011 | Kendall et al. ........... 361/679.01 |
| 8,385,080 B2 * | 2/2013 | Kim et al. ...................... 361/783 |
| 8,408,662 B2 * | 4/2013 | Wang et al. ................. 312/223.2 |
| 8,720,848 B2 * | 5/2014 | Tan et al. ....................... 248/551 |

* cited by examiner

*Primary Examiner* — Dhirubhai R Patel

(74) *Attorney, Agent, or Firm* — Muncy, Geissler, Olds & Lowe, P.C.

(57) ABSTRACT

A securing device for securing an electric device having a groove is disclosed. The securing device includes a base and a buckle-hook module. The base covers a portion of the electric device and has a connecting part corresponding to the groove. An operating unit and a buckle-hook unit of the buckle-hook module are rotatably disposed in the connecting part. The operating unit has a first position and a second position. The buckle-hook unit has an insert part. A resetting unit of tile buckle-hook module is disposed between the buckle-hook unit and the connecting part, so that the buckle-hook unit is rotated to and from. When the operating unit is moved from the first position to the second position, the insert part inserts into the groove, for securing the electric device.

10 Claims, 6 Drawing Sheets

SECURING DEVICE

CROSS-REFERENCE TO RELATED APPLICATION

This application claims the benefit of Taiwan Patent Application No. 102100576, filed on Jan. 8, 2013, in the Taiwan Intellectual Property Office, the disclosure of which is incorporated herein in its entirety by reference.

FIELD OF THE INVENTION

The present invention relates to a securing device, and more particularly to the securing device capable of securing a portable electronic device in a vehicle compartment.

BACKGROUND OF THE INVENTION

As science and technology advance, the application of electronic devices becomes more diversified and convenient, and people rely on electronic devices increasingly. At present, various convenient electronic devices such as the portable electronic devices including tablet PCs, mobile phones, Personal Digital Assistants (PDA) or Global Positioning Systems (GPS) are used in cars. The aforementioned portable electronic devices not only provide applications in cars and map guidance, but also provide multimedia entertainments to passengers. Therefore, the chance and time of using portable electronic devices in cars are increased, and these devices become indispensable to drivers or passengers in cars. Therefore, a securing device for securing a portable electronic device in a car compartment becomes important.

In a conventional securing device, some securing devices hold an electronic device by compressing and clamping in order to fix the electronic device. However, the electronic device adopting such securing method may fall out easily or even injure the driver or passenger when a relatively large force is applied. Some other securing devices further prevent the aforementioned problem by using a casing in a shape corresponding to the shape of the electronic device to cover the electronic device and fix the electronic device. However, such securing method makes the installation or removal of the electronic device with respect to the securing device more difficult.

On the other hand, most securing devices simply use a single electronic device securing function. If it is necessary to connect an electronic device with an automobile electronic device, additional wiring must be required, thus causing tremendous inconvenience to users.

In view of the aforementioned problems of the conventional securing device, the inventor of the present invention based on years of experience in the related industry to conduct extensive researches and experiments, and finally developed a convenient and cost-effective securing device to overcome the aforementioned problem and promote the development of related industries,

SUMMARY OF THE INVENTION

Therefore, it is a primary objective of the present invention to provide a securing device to overcome the problems of the conventional securing device with a low reliability and a narrow scope of applicability of fixing portable electronic devices.

To achieve the aforementioned objective, the present invention provides a securing device for securing an electronic device, and the electronic device has a groove formed on a side of the electronic device. The securing device comprises a base and a buckle-hook module. The base is covered onto a portion of the electronic device, and having a connecting part corresponding to a side of the groove. The buckle-hook module comprises an operating unit, a buckle-hook unit and a resetting unit. The operating unit is rotatably disposed in the connecting part, and the operating unit has a first position and a second position. The buckle-hook unit is rotatably disposed in the connecting part and disposed between the operating unit and the electronic device, the buckle-hook unit has an insert part. The resetting unit is disposed between the buckle-hook unit and the connecting part, for rotating the buckle-hook unit reciprocally. When the operating unit is moved from the first position to the second position, the operating unit abuts against the buckle-hook unit to insert the insert part into the groove for securing the electronic device.

Preferably, the electronic device has at least one positioning hole formed on the other side opposite to the side of the base, and the base has at least one positioning part being disposed on the other side opposite to the side of the base for inserting the at least one positioning part into the at least one positioning hole.

Preferably, the securing device further comprises at least one data processing module and at least one first transmission interface, wherein the data processing module is electrically coupled to first transmission interface, for exchanging data with the electronic device through the first transmission interface.

Preferably, the securing device further comprises at least one second transmission interface, and the data processing module is electrically coupled to second transmission interface for exchanging data with another electronic device through the second transmission interface.

Preferably, the securing device further comprises a locking module being disposed on the connecting part for locking or releasing the operating unit with respect to the second position.

Preferably, the locking module includes a locking column, and the operating unit includes a locking hole corresponding to a position of the locking column, such that when the locking module locks the operating unit at the second position, the locking column inserts into the locking hole.

Preferably, the base is substantially an L-shaped structure covered onto the other side and the back of the electronic device.

Preferably, the base includes a plurality of bolt parts corresponding to a wall of the back of the electronic device for securing the base into a vehicle by a plurality of bolts corresponding to the plurality of bolt parts.

Preferably, the connecting part includes a limit part, and the resetting unit is an elastic member having a resetting unit body extended from two substantially perpendicular sides to form a first abutting part and a second abutting part respectively, and the first abutting part abuts against the limit part, and the second abutting part abuts against the buckle-hook unit, such that when the operating unit is moved from the second position to the first position, the second abutting part abuts against the buckle-hook unit by an elastic resilience of the resetting unit to link the insert part to separate from the groove.

Preferably, the buckle-hook unit has a convex part disposed separately on both sides of the abutting position of the operating unit, and the convex part is protruded in an arc shape from the buckle-hook unit towards the operating unit.

In summation, the securing device of the present invention has one or More of the following advantages:

(1) The securing device is capable of inserting the insert part of the buckle-hook unit into the groove of an electronic device, and thus improving the stability of the securing device for securing the electronic device.

(2) The securing device is capable of inserting the insert part into the groove or separating the insert part from the groove by moving the operating unit reciprocally to the first position and the second position, and thus improving the convenience of installing or removing the electronic device.

(3) The securing device is provided for exchanging data between the electronic device and other electronic devices by the data processing module, the first transmission interface and the second transmission interface, and thus improving the practicability of the securing device.

DESCRIPTION OF THE PREFERRED EMBODIMENTS

The technical characteristics, contents, advantages and effects of the present invention will be apparent with the detailed description of a preferred embodiment accompanied with related drawings as follows. The drawings are provided for the illustration, and same numerals are used to represent respective elements in the preferred embodiments. It is intended that the embodiments and drawings disclosed herein are to be considered illustrative rather than restrictive.

Figure 1:
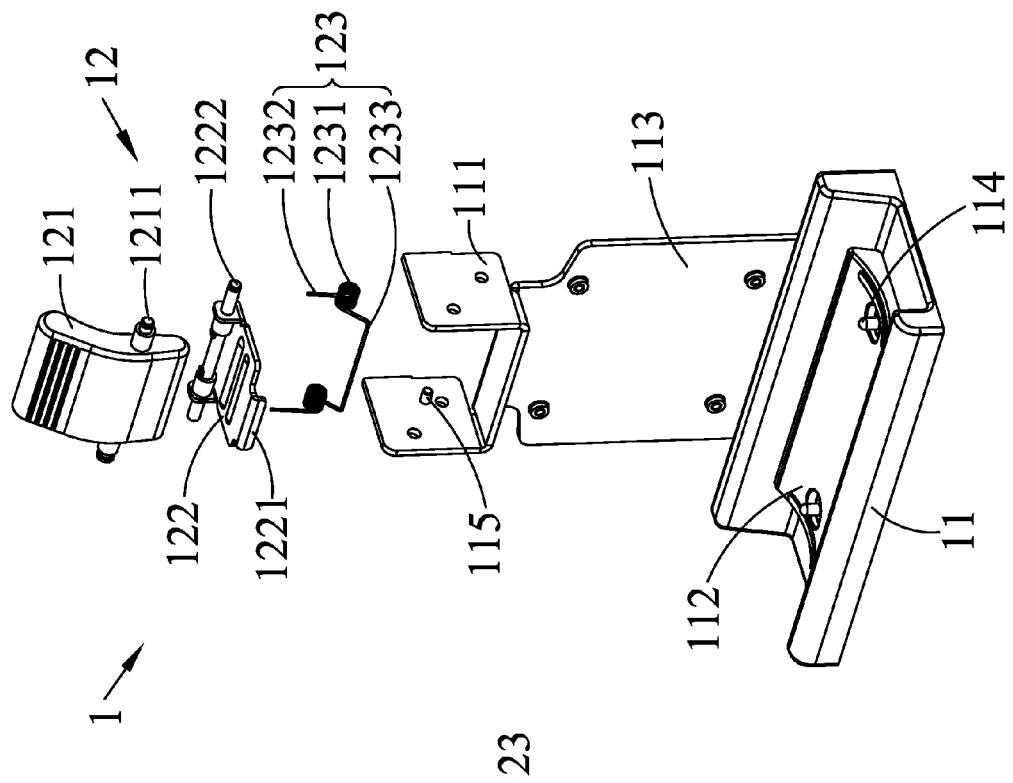
FIG. 1 is an exploded view of a securing device in accordance with a first preferred embodiment of the present invention.
Figure 1:
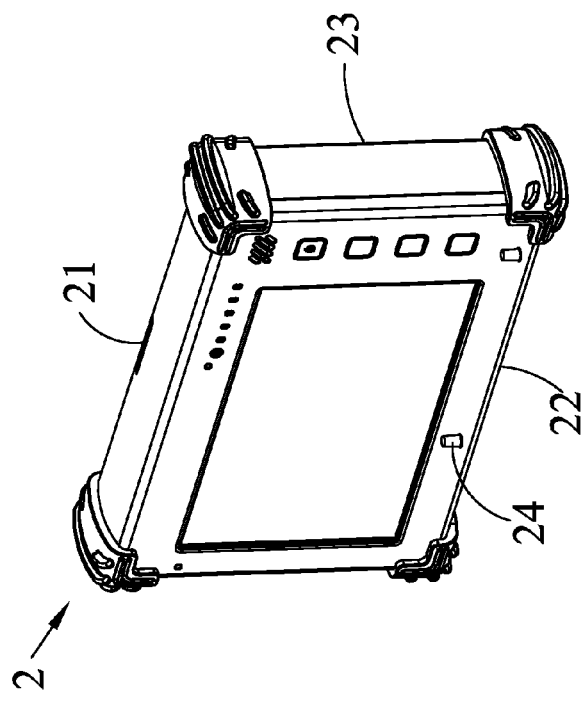
Figure 2:
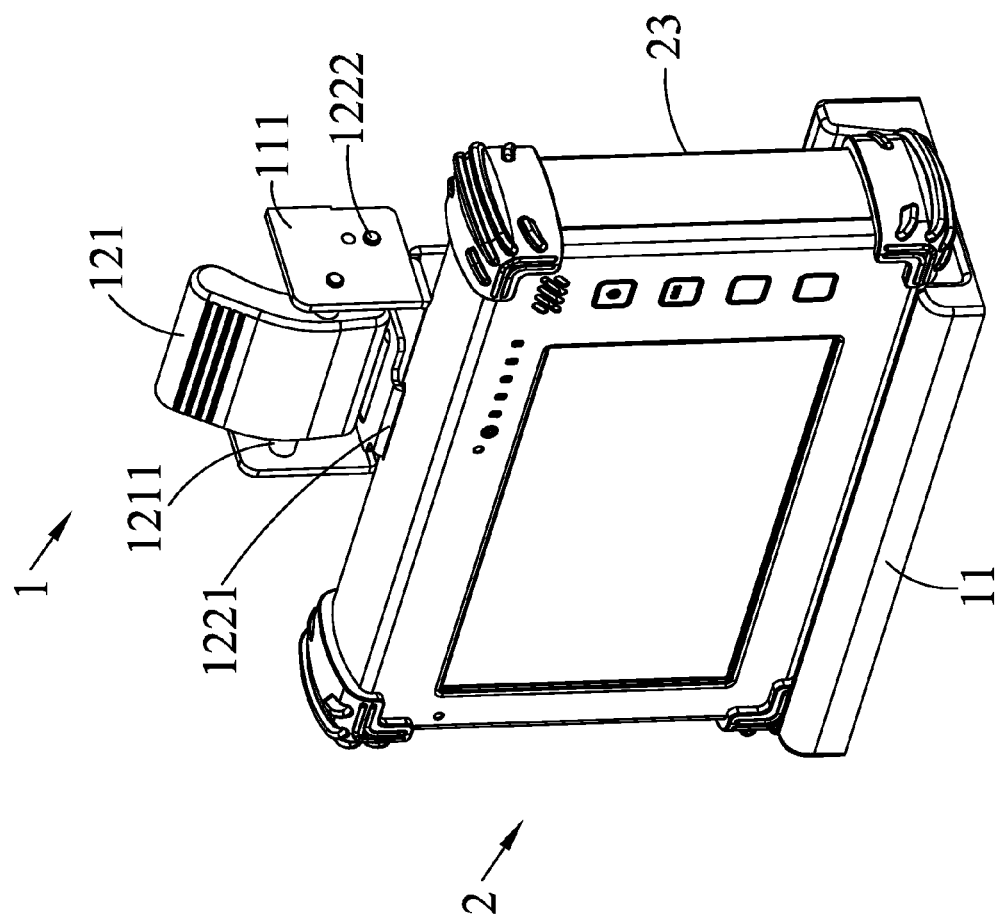
FIG. 2 is an assembled view of a securing device in accordance with the first preferred embodiment of the present invention.
Figure 3:
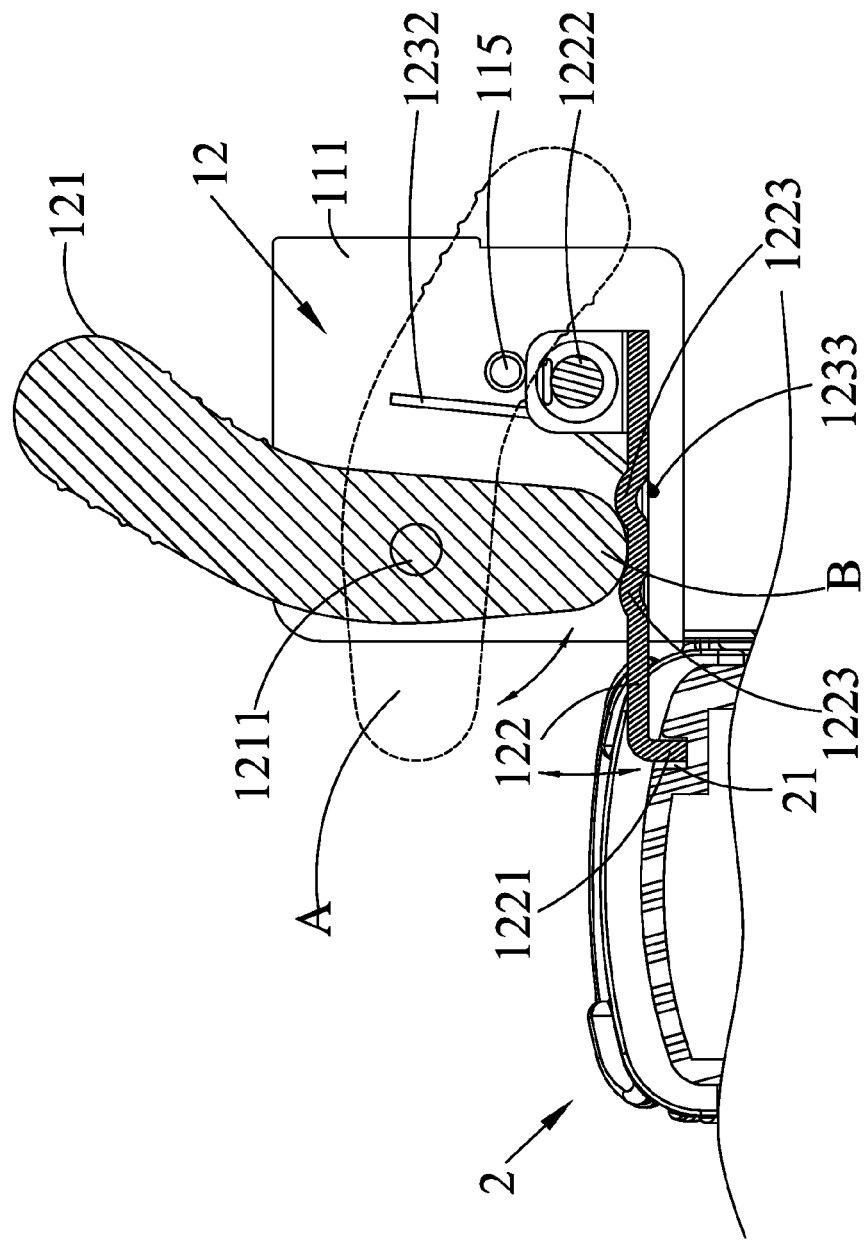
FIG. 3 is a schematic partial view of a buckle-hook module of a securing device in accordance with the first preferred embodiment of the present invention.

With reference to FIGS. 1 to 3 for an exploded view and an assembled view of a securing device and a partial schematic view of a buckle-hook module in accordance with the first preferred embodiment of the present invention respectively, the securing device 1 is applied for securing an electronic device 2 at a predetermined position such as a position near a driver seat in a car compartment. Wherein, the electronic device 2 has a groove 21 formed on a side of the electronic device 2, and the electronic device 2 can be a portable electronic device including but not limited to a notebook computer, a tablet PC, a mobile phone, a Personal Digital Assistant (PDA) or a Global Positioning System (GPS). In this preferred embodiment, the tablet PC is used as an example of the electronic device 2 for illustrating the invention.

The securing device 1 comprises a base 11 and a buckle-hook module 12. The base 11 is configured, such that the base 11 is covered onto a portion of the electronic device 2, and the base 11 has a connecting part 111 formed on a side of the base 11 corresponding to the groove 21. The buckle-hook module 12 includes an operating unit 121, a buckle-hook unit 122 and a resetting unit 123. Wherein, the operating unit 121 is rotatably disposed in the connecting part 111, and the operating unit 121 has a first position A and a second position B. The buckle-hook unit 122 is rotatably disposed in the connecting part 111 and disposed between the operating unit 121 and the electronic device 2. The buckle-hook unit 122 has an insert part 1221 corresponding to the groove 21 of the electronic device 2. The resetting unit 123 is disposed between the buckle-hook unit 122 and the connecting part 111, such that the buckle-hook unit 122 can be rotated reciprocally. When an external force (such as a force applied by a user's hand) is acted onto the operating unit 121, and the operating unit 121 is moved from the first position A to the second position B, the insert part 1221 of the buckle-hook unit 122 inserts into the groove 21 to secure the electronic device 2 onto the securing device 1.

More specifically, the base 11 can be an L-shaped structure to cover onto a portion of the electronic device 2. For example, a bottom surface 112 of the L-shaped structure supports a bottom side 22 of the electronic device 2, and a sidewall 113 of the L-shaped structure supports a back 23 of the electronic device 2. Another electronic device connected to the electronic device 2 can be electrically coupled and can transmit data through a port on the remaining uncovered part of the electronic device 2.

At least one positioning part 114 is disposed on the bottom surface 112 of the base 11, and the bottom side 22 of the electronic device 2 has at least one positioning hole 24 corresponding to a position of the positioning part 114. In this preferred embodiment, the number of the positioning parts 114 and the number of positioning holes 24 are both equal to 2, and this number is used for the purpose of illustrating the invention only. When the bottom side 22 of the electronic device 2 is supported by the bottom surface 112 of the base 11, the positioning part 114 can insert into the positioning hole 24 to assure the stability of securing the electronic device 2.

In summation, the groove 21 of the electronic device 2 can be formed at the top of the electronic device 2, and the connecting part 111 of the base 11 can be arranged at the top of the sidewall 113 of the base 11 and at a position corresponding to the groove 21. It is noteworthy that the connecting part 111 can be integrally formed with the base 11 or installed on the base 11 through an additional component. In addition, the connecting part 111 can be a U-shaped structure to provide an accommodating space for installing the operating unit 121, the buckle-hook unit 122 and the resetting unit 123.

With reference to FIG. 3, the operating unit 121 is in an arc shape to facilitate users to perform operations, and two first rotating shaft 1211 are disposed on both sides of the operating unit 121 respectively and pivotally coupled to a sidewall of the accommodating space. An end of the buckle-hook unit 122 proximate to the groove 21 is an insert part 1221, and the other end of the buckle-hook unit 122 has a second rotating shaft 1222. Similarly, both ends of the second rotating shaft 1222 are pivotally disposed on sidewalls of the accommodating space. The resetting unit 123 is an elastic member (such as a spring) with a resetting unit body 1231 extended from two substantially perpendicular sides to form a first abutting part 1232 and a second abutting part 1233 respectively. The resetting unit body 1231 is sheathed on the second rotating shaft 1222, and the first abutting part 1232 abuts against a limit part 115 of the connecting part 111, and the second abutting part 1233 abuts against the buckle-hook unit 122. When the operating unit 121 moves from the first position A to the second position B, the operating unit 121 abuts against the buckle-hook unit 122, such that both operating unit 121 and buckle-hook unit 122 can rotate together. Now, the insert part 1221 inserts into the groove 21, and the resetting unit 123 is pulled and stretched gradually by the buckle-hook unit 122. When the operating unit 121 moves from the second position B to the first position A, the elastic resilience of the resetting unit 123 drives the second abutting part 1233 to abut against the buckle-hook unit 122 to link the insert part 1221 to separate from the groove 21. It is noteworthy that the buckle-hook unit 122 has two convex parts 1223 respectively disposed on both sides of the abutting position of the operating unit 121 and protruded in an arc shape from the buckle-hook unit 122 towards the operating unit 121. The two convex parts 1223 are provided for restricting the freedom of the operating unit 121 at the second position B, so that the operating unit 121 can be secured at the second position B. In addition, the convex parts 1223 are an arc shaped structure, so that the operating unit 121 can be moved reciprocally to the first position A and the second position B to provide a convenient operation without being affected by the convex parts 1223.

By the aforementioned method, the present invention achieves a quick securing effect by simply turning the operating unit 121, and the positioning part 114 and the insert part 1221 are inserted into the positioning hole 24 and the groove 21 respectively to secure the electronic device 2.

Figure 4:
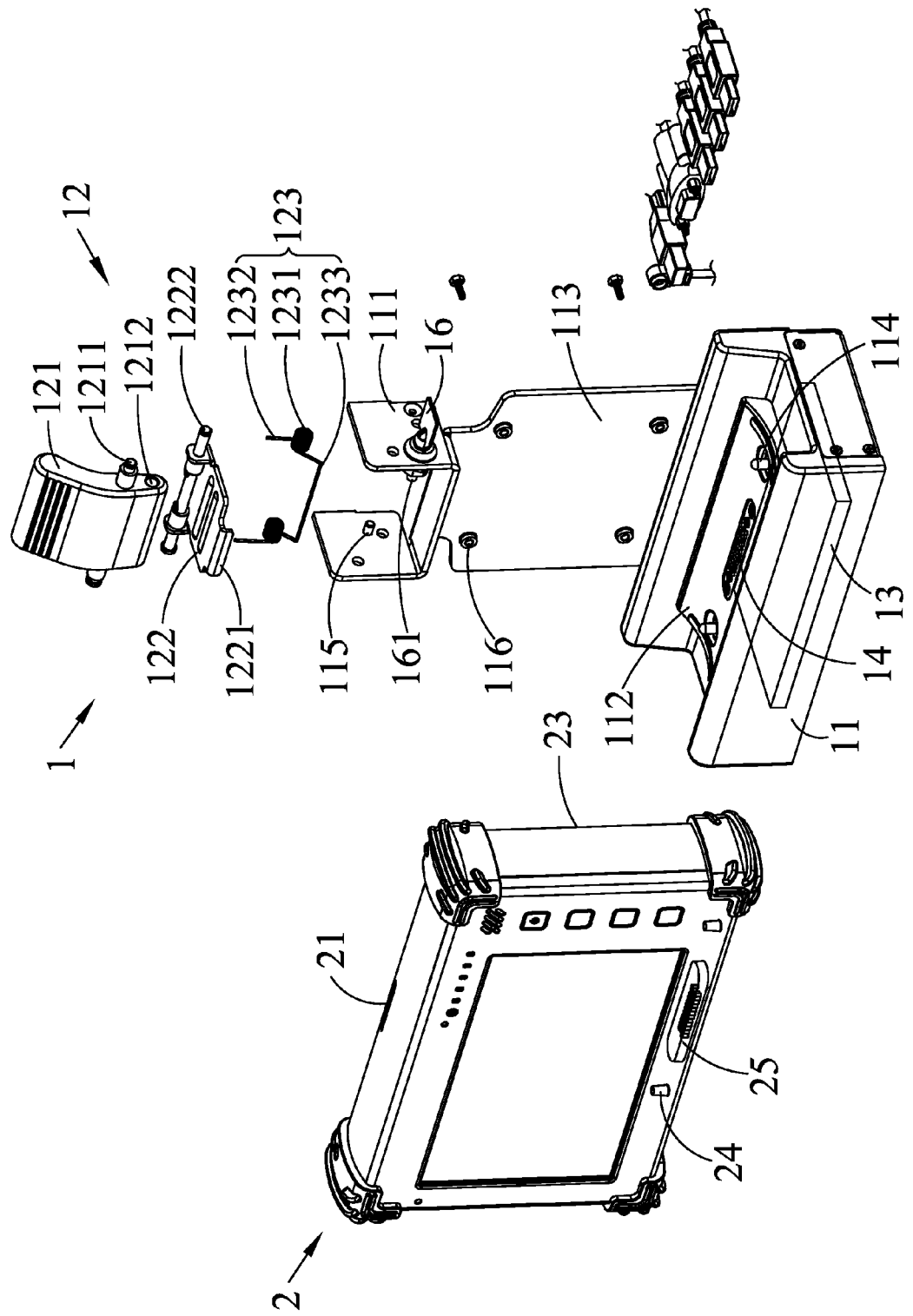
FIG. 4 is a first exploded view of a securing device in accordance with a second preferred embodiment of the present invention.
Figure 5:
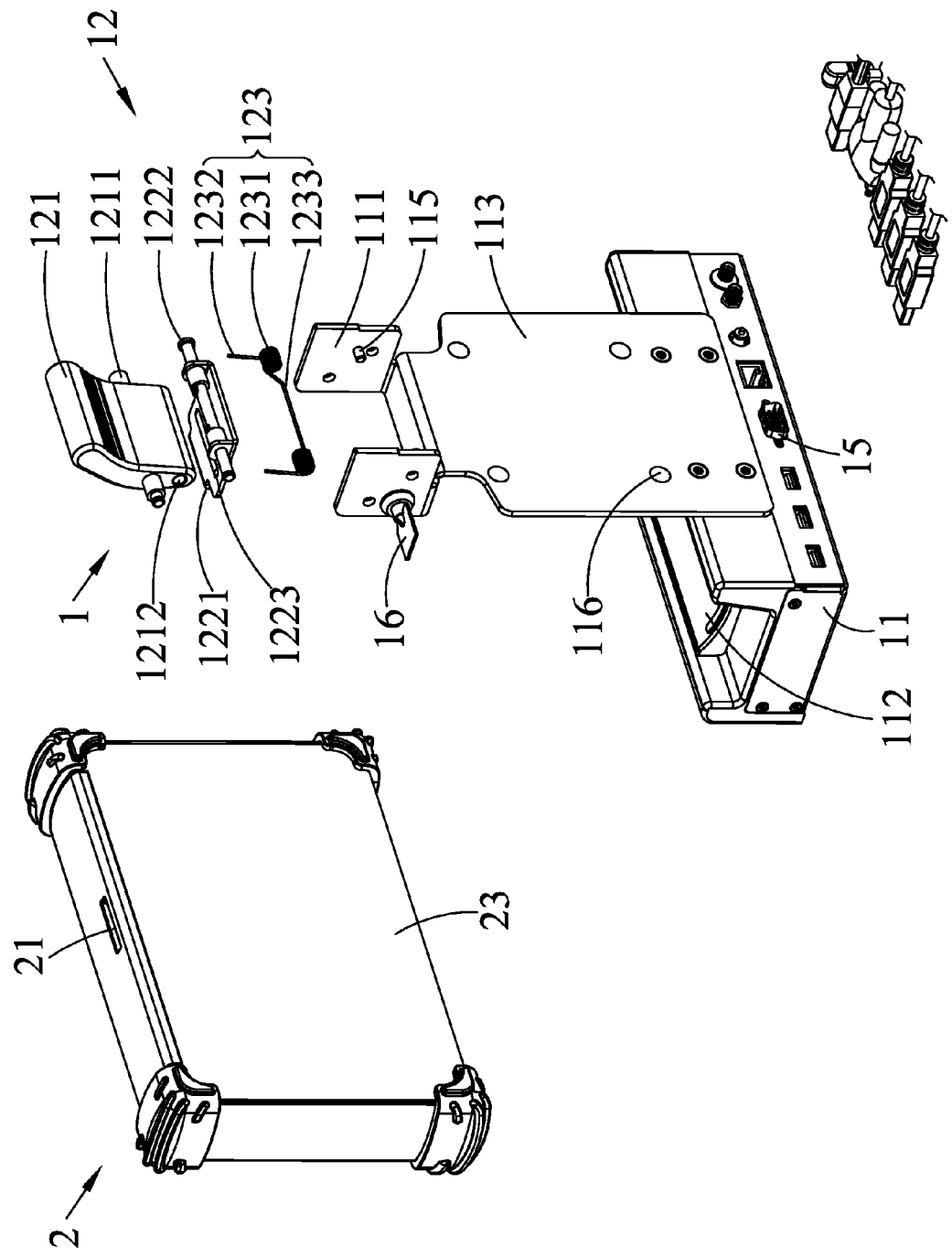
FIG. 5 is a second exploded view of a securing device in accordance with the second preferred embodiment of the present invention.
Figure 6:
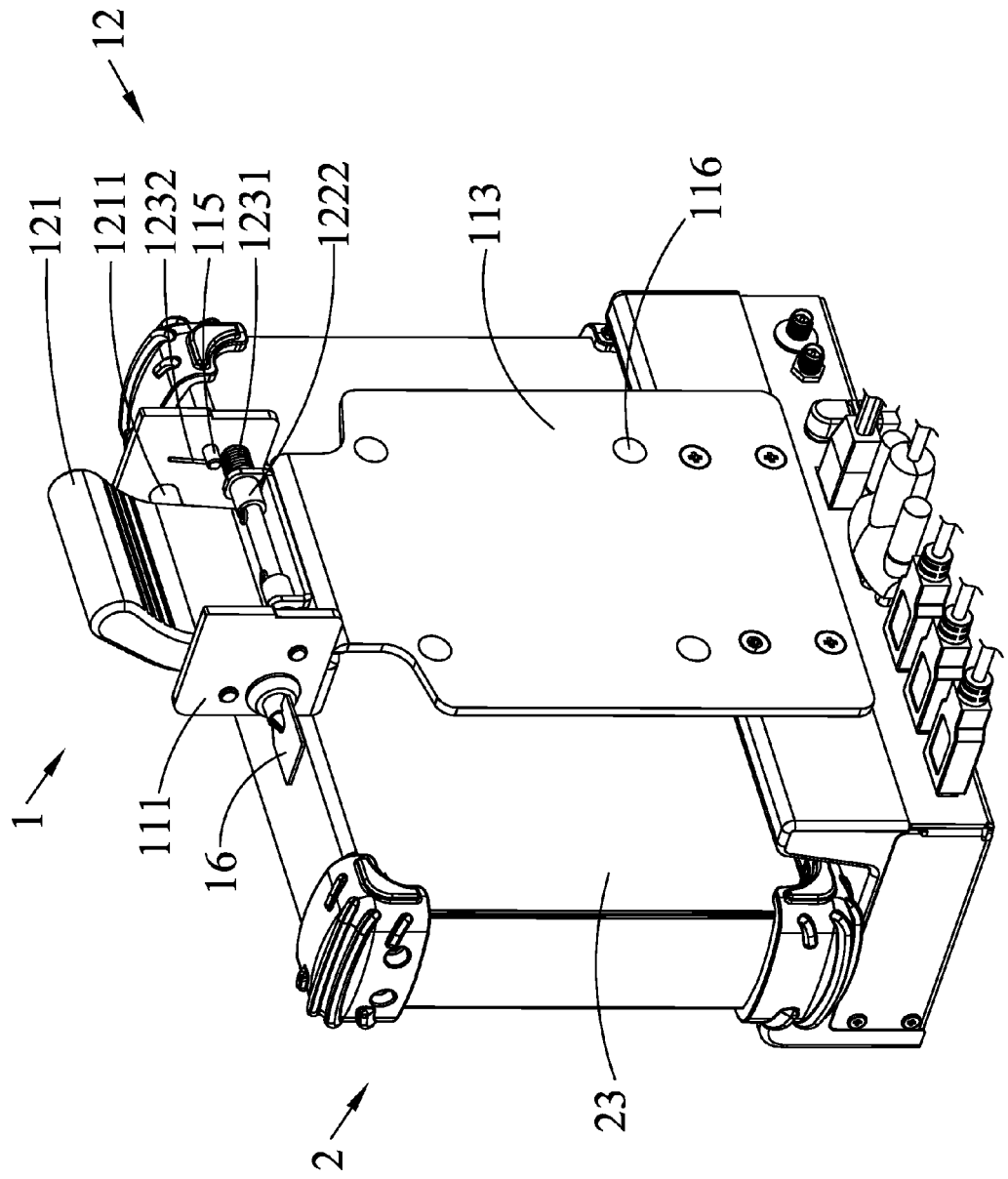
FIG. 6 is an assembled view of a securing device in accordance with the second preferred embodiment of the present invention.

With reference to FIGS. 4 to 6 for the first and second exploded views and a assembled view of a securing device in accordance with the second preferred embodiment of the present invention respectively, the connection and movement of each component are similar to the previous preferred embodiment, and thus will not be repeated, and a portable electronic device is used as an example of the electronic device for illustrating the invention. In addition to the components as described in the previous preferred embodiment, the securing device 1 of this preferred embodiment further comprises a data processing module 13, at least one first transmission interface 14 and at least one second transmission interface 15. The data processing module 13 is electrically coupled to the first transmission interface 14 and the second transmission interface 15. The data processing module 13 exchanges data with the portable electronic device 2 through the first transmission interface 14, and communicate with another electronic device through the second transmission interface 15, and the other electronic device can be an automobile computer or an automobile screen.

More specifically, the base 11 has an accommodating space formed therein for containing the data processing module 13, the first transmission interface 14 and the second transmission interface 15, and the first transmission interface 14 and the second transmission interface 15 are exposed from the bottom surface 112 of the base 11 and the sidewall 113 of the base 11. On the other hand, the portable electronic device 2 has a third transmission interface 25 corresponding to the first transmission interface 14. In this preferred embodiment, the third transmission interface 25 is disposed on the bottom side 22 of the portable electronic device 2. Therefore, when the portable electronic device 2 is set on the base 11, the portable electronic device 2 and the securing device 1 can be electrically coupled to exchange data. For example, the first transmission interface 14 can be a male port, and the third transmission interface 25 can be a female port. When the portable electronic device 2 is set on the base 11, the male port can be inserted into the female port for an electrical connection. In addition, the aforementioned arrangement can substitute for the positioning part 114 and the positioning hole 24 or assist enhancing the positioning function of the positioning part 114 and the positioning hole 24.

On the other hand, when the second transmission interface 15 is electrically coupled to another electronic device, the securing device 1 can be used as a relay station provided for the portable electronic device 2 and the other electronic device to exchange data. For example, a display screen of the portable electronic device 2 is sent to other display units in the car compartment and displayed by the other display units, or the portable electronic device 2 is electrically coupled to an automobile computer to perform co-operations of the two.

In a preferred embodiment, the securing device 1 can include a locking module 16 disposed on the connecting part 111 corresponding to a position of the operating unit 121 for locking or releasing the operating unit 121. In this preferred embodiment, the locking module 16 is a lock. When a user set the portable electronic device 2 on the base 11, the user can lock the locking module 16 by a key to restrict the freedom of the operating unit 121 and prevent the operating unit 121 from being rotated. In other words, the portable electronic device 2 cannot be removed from the securing device 1, in order to effectively prevent the portable electronic device 2 from being stolen. More specifically, the locking module 16 has a locking column 161, and the operating unit 121 has a locking hole 1212 formed at a position corresponding to the locking column 161. When the locking module 16 locks the operating unit 121 at the second position B, the locking column 161 inserts into the locking hole 1212 to lock the operating unit 121 at the second position B. The skill of turning a key to insert the locking column 161 into the locking hole 1212 is well known by persons having ordinary skill of the art, so that such prior art will not be described in details.

It is noteworthy that the securing device 1 can be set in the car compartment by locking or latching. In this preferred embodiment, the base 11 has a plurality of bolt parts 116 disposed on a wall corresponding to the back of the electronic device 2, so that the base 116 is fixed in the car compartment, by a plurality of the bolts correspond to the plurality of bolt parts.

In summation of the description above, the present invention can secure an electronic device to a securing device by a simple operation and locks the electronic device by a locking module, so as to achieve the effects of providing a convenient use and a high protection. In addition, different transmission interfaces can be used for exchanging data between the electronic device and the securing device or any other electronic device to improve the overall practicability.

What is claimed is:

1. A securing device, for securing an electronic device, and the electronic device having a groove formed on a side of the electronic device, and the securing device comprising: a base, partially covered onto the electronic device, and having a connecting part disposed on a side wall of the base corresponding to the groove; and a buckle-hook module, comprising: an operating unit, rotatably disposed in the connecting part, and having a first position, and a second position; a buckle-hook unit, rotatably disposed in the connecting part, and disposed between the operating unit and the electronic device, and having an insert part; and a resetting unit, disposed between the buckle-hook unit and the connecting part, for rotating the buckle-hook unit reciprocally; wherein, when the operating unit is moved from the first position to the second position, the operating unit abuts against the buckle-hook unit to insert the insert part into the groove for securing the electronic device.

2. The securing device of claim 1, wherein the electronic device has at least one positioning hole formed on a side opposite to the side wall of the base, and the base has at least one positioning part being disposed on the side opposite to the side wall of the base for inserting the at least one positioning part into the at least one positioning hole.

3. The securing device of claim 1, further comprising at least one data processing module and at least one first transmission interface, and the data processing module being electrically coupled to the first transmission interface for exchanging data with the electronic device through the first transmission interface.

4. The securing device of claim 3, further comprising at least one second transmission interface, the data processing module electrically coupled to the second transmission interface for exchanging data with another electronic device through the second transmission interface.

5. The securing device of claim 1, further comprising a locking module disposed on the connecting part for locking or releasing the operating unit with respect to the second position.

6. The securing device of claim 5, wherein the locking module includes a locking column, and the operating unit includes a locking hole corresponding to a position of the locking column, such that when the locking module locks the operating unit at the second position, the locking column inserts into the locking hole.

7. The securing device of claim 1, wherein the base is substantially an L-shaped structure covered onto the side and the back of the electronic device.

8. The securing device of claim 7, wherein the base includes a plurality of bolt parts corresponding to a wall of the back of the electronic device for securing the base into a vehicle by a plurality of bolts corresponding to the plurality of bolt parts.

9. The securing device of claim 1, wherein the connecting part includes a limit part, and the resetting unit is an elastic member having a resetting unit body extended from two substantially perpendicular sides to form a first abutting part and a second abutting part respectively, and the first abutting part abuts against the limit part, and the second abutting part abuts against the buckle-hook unit, such that when the operating unit is moved from the second position to the first position, the second abutting part abuts against the buckle-hook unit by an elastic resilience of the resetting unit to link the insert part to separate from the groove.

10. The securing device of claim 1, wherein the buckle-hook unit has a plurality of convex parts disposed respectively on both sides of the abutting position of the operating unit, and the convex parts are protruded in an arc shape from the buckle-hook unit towards the operating unit.

\* \* \* \* \*